(12) United States Patent
Nagai

(10) Patent No.: US 6,848,478 B2
(45) Date of Patent: Feb. 1, 2005

(54) FLEXIBLE TUBE

(75) Inventor: Tadashi Nagai, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/326,882

(22) Filed: Dec. 23, 2002

(65) Prior Publication Data

US 2003/0150502 A1 Aug. 14, 2003

(30) Foreign Application Priority Data

Dec. 25, 2001 (JP) .................................... P.2001-391845

(51) Int. Cl.[7] .................................................. F16L 9/18
(52) U.S. Cl. ....................... 138/112; 138/114; 138/121; 138/122; 138/135; 138/148
(58) Field of Search ................. 138/112, 114, 138/121, 122, 135, 148

(56) References Cited

U.S. PATENT DOCUMENTS

| 3,837,364 | A | * | 9/1974 | Jenner ........................ 464/175 |
| 3,945,803 | A | * | 3/1976 | Musall et al. ................ 422/179 |
| 4,562,733 | A | * | 1/1986 | Kant .......................... 73/295 |
| 5,660,419 | A | * | 8/1997 | Kim ........................... 285/226 |
| 5,813,704 | A | | 9/1998 | Naito |
| 5,901,754 | A | * | 5/1999 | Elsasser et al. ............. 138/118 |
| 6,062,266 | A | * | 5/2000 | Burkhardt .................... 138/114 |
| 6,062,268 | A | | 5/2000 | Elsässer et al. |
| 6,116,287 | A | * | 9/2000 | Gropp et al. ................ 138/114 |
| 6,125,889 | A | * | 10/2000 | Elsasser et al. ............. 138/118 |
| 6,155,303 | A | * | 12/2000 | Krawietz et al. ............ 138/135 |
| 6,230,748 | B1 | * | 5/2001 | Krawietz et al. ............ 138/121 |
| 6,568,431 | B2 | * | 5/2003 | Marchal ...................... 138/112 |

FOREIGN PATENT DOCUMENTS

| EP | 0 875 669 A2 | 11/1998 |
| FR | 2 032 068 | 11/1970 |

* cited by examiner

*Primary Examiner*—James Hook
(74) *Attorney, Agent, or Firm*—Foley & Lardner LLP

(57) ABSTRACT

A small-diameter part in the vicinity of a center of a bellows portion in an axial direction has a smaller diameter. A tip end of the small-diameter part contacts at a point A with an outer peripheral face of an interlock pipe. The interlock pipe vibrates with using the point A and points B in both ends as fulcrums. The addition of the point A reduces distance between the fulcrums. In accordance with this reduction, deflection amount of the interlock pipe is reduced and vibration amplitude of the interlock pipe is decreased. Therefore, the interlock pipe does not contact with the bellows portion so that troubles such as noises can be prevented from occurring.

9 Claims, 6 Drawing Sheets

FLEXIBLE TUBE

CROSS-REFERENCE TO RELATED APPLICATIONS

The present disclosure relates to the subject matter contained in Japanese Patent Application No.2001-391845 filed on Dec. 25, 2001, which is incorporated herein by reference in its entirety.

BACKGROUND OF THE INVENTION

1. Field of the Invention

The present invention relates to a structure of a flexible tube including an interlock pipe and a bellows tube.

2. Description of the Related Art

In an exhaust pipe of an engine or the like, a part of the exhaust pipe is sometimes configured by a flexible tube in order to improve easiness of layout, etc. FIG. 5 shows an example of such a flexible tube. A flexible tube 1A has an outer blade 3, which is placed on the outer peripheral side of a bellows tube 9 having a bellows portion 9c, and an interlock pipe 4, which is placed on the inner peripheral side of the bellows tube 9.

Each of straight portions 2a of the bellows tube 9, and corresponding one of end portions 3a of the outer blade 3 are placed with being overlaid on the outer peripheral face of the interlock pipe 4. A protector 5 is placed on the outer peripheral side of the end portion 3a of the outer blade 3. The protector 5, the straight portion 2a, and the end portion 3a are welded to the outer peripheral face of the interlock pipe 4.

The inner peripheral diameter of the bellows portion 9c of the bellows tube 9 is set to be larger than that of the straight portion 2a, so that a gap is formed between the bellows portion and the outer peripheral face of the interlock pipe 4. Even when the flexible tube 1A swings due to vibrations of the engine or the like, therefore, the outer peripheral face of the interlock pipe 4 and the bellows portion 9c are prevented from contacting with each other.

In a flexible tube 1B which is structured as described above and has a long total length as shown in FIG. 6, when the flexible tube 1B vibrates, the swing amplitude of the interlock pipe 4 is larger as the length is larger. As a result, the outer peripheral face of the interlock pipe 4 and the bellows portion 9c contact with each other, thereby causing troubles such as noises.

SUMMARY OF THE INVENTION

In view of the problem, it is an object of the invention to provide a flexible tube in which troubles such as noises are not caused even when a flexible tube has a long total length and vibrations of an engine or the like are produced.

According to a first aspect of the invention, there is provided a flexible tube including a bellows tube, an interlock pipe, and a restriction member. The bellows tube has a bellow portion and straight portions, which is formed both ends thereof. The interlock pipe in which a plurality of annular plate members or spirally wound band plates are flexibly coupled at side edges thereof to one another through an interlock mechanism, is disposed inside the bellows tube to have a common axis. The restriction member is disposed on the bellow portion and serves as a fulcrum to restrict vibration amplitude of the interlock pipe when the interlock pipe is vibrated. Inner diameter of the straight portions tube is larger than that of first small-diameter parts of the bellow portion. Inner peripheral surfaces of the straight portions are fixed to an outer surface of the interlock pipe.

According to a second aspect of the invention, the bellow portion has a second small-diameter part, inner diameter of which is smaller than that of the first small-diameter parts. An inner peripheral tip of the second small-diameter part abuts against the outer peripheral surface of the interlock pipe to define the restriction member.

According to a third aspect of the invention, the restriction member is a buffer member disposed between an inner peripheral tip of at least one of the first small-diameter parts and the outer peripheral surface of the interlock pipe.

According to a fourth aspect of the invention, the bellow portion has a second small-diameter part, inner diameter of which is smaller than that of the first small-diameter parts. The restriction member is a buffer member disposed between an inner peripheral tip of the second small-diameter part and the outer peripheral surface of the interlock pipe.

According to a fifth aspect of the invention, the bellow portion has third small-diameter parts, inner diameter of which smaller than that of the first small-diameter part. The restriction member is a buffer member, which is disposed between an inner peripheral tip of at least one of the first small-diameter parts and the outer peripheral surface of the interlock pipe so that the third small-diameter parts holds the buffer member in the axial direction.

According to a sixth aspect of the invention, the restriction member is a plurality of restriction members arranged in the axial direction at a predetermined interval.

DETAILED DESCRIPTION OF THE PREFERRED EMBODIMENTS

Next, embodiments of the invention will be described.

Figure 1:
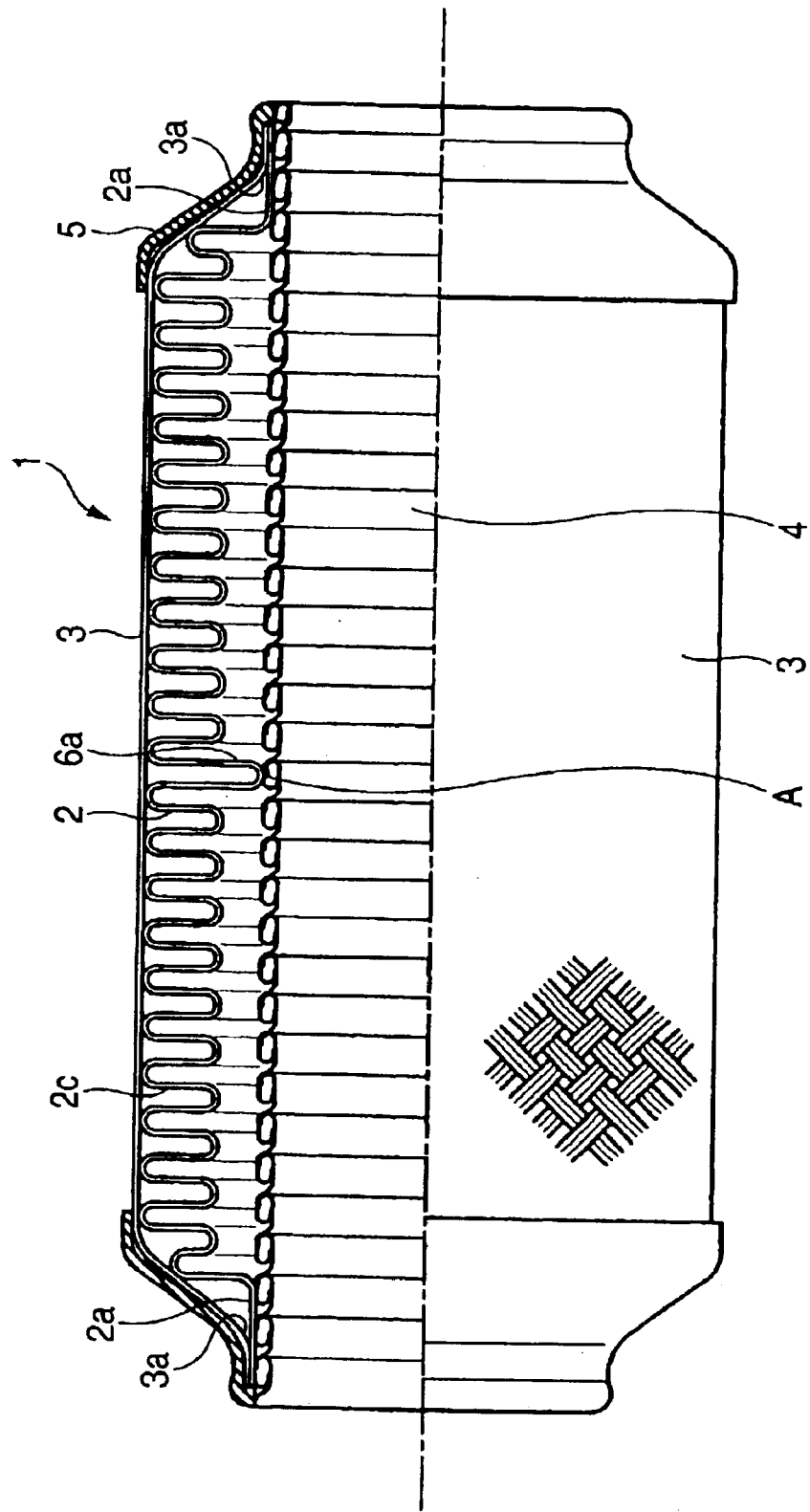
FIG. 1 is a view showing an embodiment of the invention.

FIG. 1 is a section view of an embodiment.

A flexible tube 1 has an outer blade 3 including a braided tube, which is placed on the outer peripheral side of a bellows tube 2 having a bellows portion 2c, and an interlock pipe 4, which is placed inside the bellows tube 2. Each of straight portions 2a of the bellows tube 2, and corresponding one of end portions 3a of the outer blade 3 are overlaid on the outer peripheral face of the interlock pipe 4. A protector 5 is placed on the outer peripheral side of the end portion 3a of the outer blade 3. The outer end portion of the protector 5 is squeezed so that the inner peripheral face thereof matches the outer peripheral face of the end portion 3a. The inner end portion of the protector 5 elongates toward the inner side in the axial direction while the diameter thereof is expanded to coincide with the usual outer peripheral diameter of the outer blade 3. The protector 5, the straight portion 2a of the bellows tube, and the end portion 3a of the outer blade 3 are welded to the outer peripheral face of the interlock pipe 4.

The usual diameter of the small-diameter parts of the bellows portion 2c of the bellows tube 2 is set to be larger than the inner peripheral diameter of the straight portion 2a, so that a gap is formed between the interlock pipe 4 and the bellows tube 2. In the bellows portion 2c, a small-diameter part, in the form of a restriction member, 6a in the vicinity of a center portion in an axial direction is set to have a smaller diameter. When the flexible tube 1 is in its natural state, the inner peripheral end of the restriction member 6a is in contact with the outer peripheral face of the interlock pipe 4. The contact point between the restriction member 6a and the outer peripheral face of the interlock pipe 4 is indicated by A.

The interlock pipe 4 and the tip end of the restriction member 6a contact with each other at the point A in a rattle-free condition. Even when the interlock pipe 4 vibrates, troubles such as noises are not caused in the point A.

Figure 2:
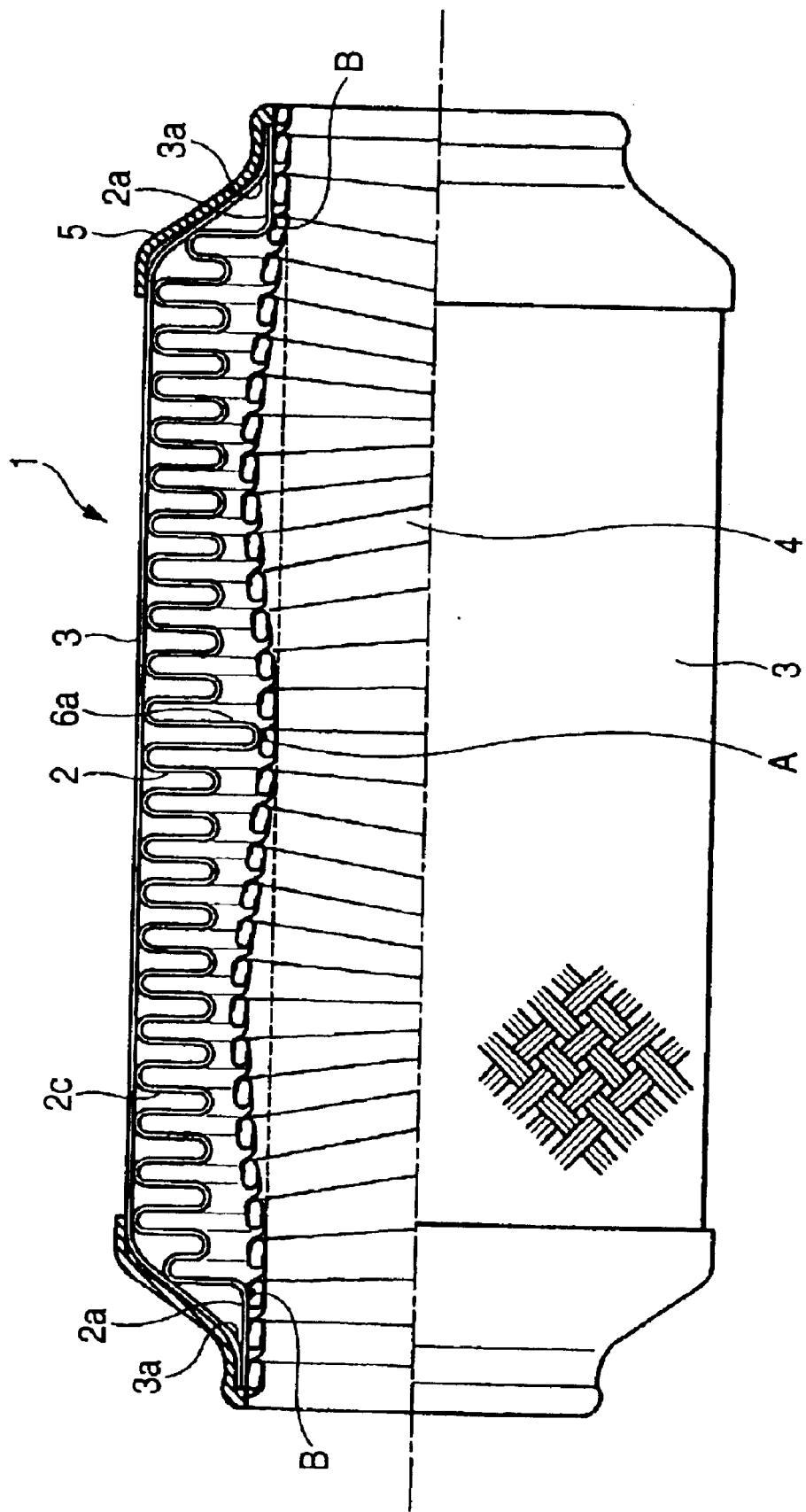
FIG. 2 is a view showing vibrations of an interlock pipe.

The motion of the interlock pipe 4 in the case where the flexible tube 1 vibrates will be described with reference to FIG. 2.

Since the tip end of the restriction member 6a contacts at the point A with the outer peripheral face of the interlock pipe 4, the interlock pipe 4 vibrates with using the point A and points B as fulcrums. The points B are boundaries between the straight portions 2a in both the ends of the bellows tube 2 and the bellows portion 2c.

The addition of the point A reduces the distance between the fulcrums. In accordance with this reduction, the deflection amount of the interlock pipe 4 is reduced, and the vibration amplitude of the interlock pipe 4 is decreased. Even when the flexible tube 1 has a long total length, any portion of the interlock pipe 4 other than the point A does not contact with the bellows portion 2c of the bellows tube 2 because the distance between the fulcrums is short.

The embodiment is configured as described above. When the flexible tube 1 vibrates and the interlock pipe 4 swings, the amplitude thereof can be reduced since the addition of a swing fulcrum by means of the restriction member 6a. Therefore, the gap between the interlock pipe 4 and the bellows tube 2 can be reduced. As a result, the outer diameter of the flexible tube can be made smaller than that of a flexible tube according to the related art which uses a bellows tube having uniform crest height (crest height refers to difference between small-diameter parts and large-diameter parts in a bellows portion).

When the outer diameter of the flexible tube is set to be equal to that of the flexible tube according to the related art, the gap between the interlock pipe 4 and the bellows tube 2 can be reduced, and in accordance with the reduced gap the crest height of the bellows tube can be increased. Therefore, the flexibility of the bellows tube can be improved, and the value of stress produced in the bellows tube can be reduced. Accordingly, the strength can be enhanced.

Figure 3:
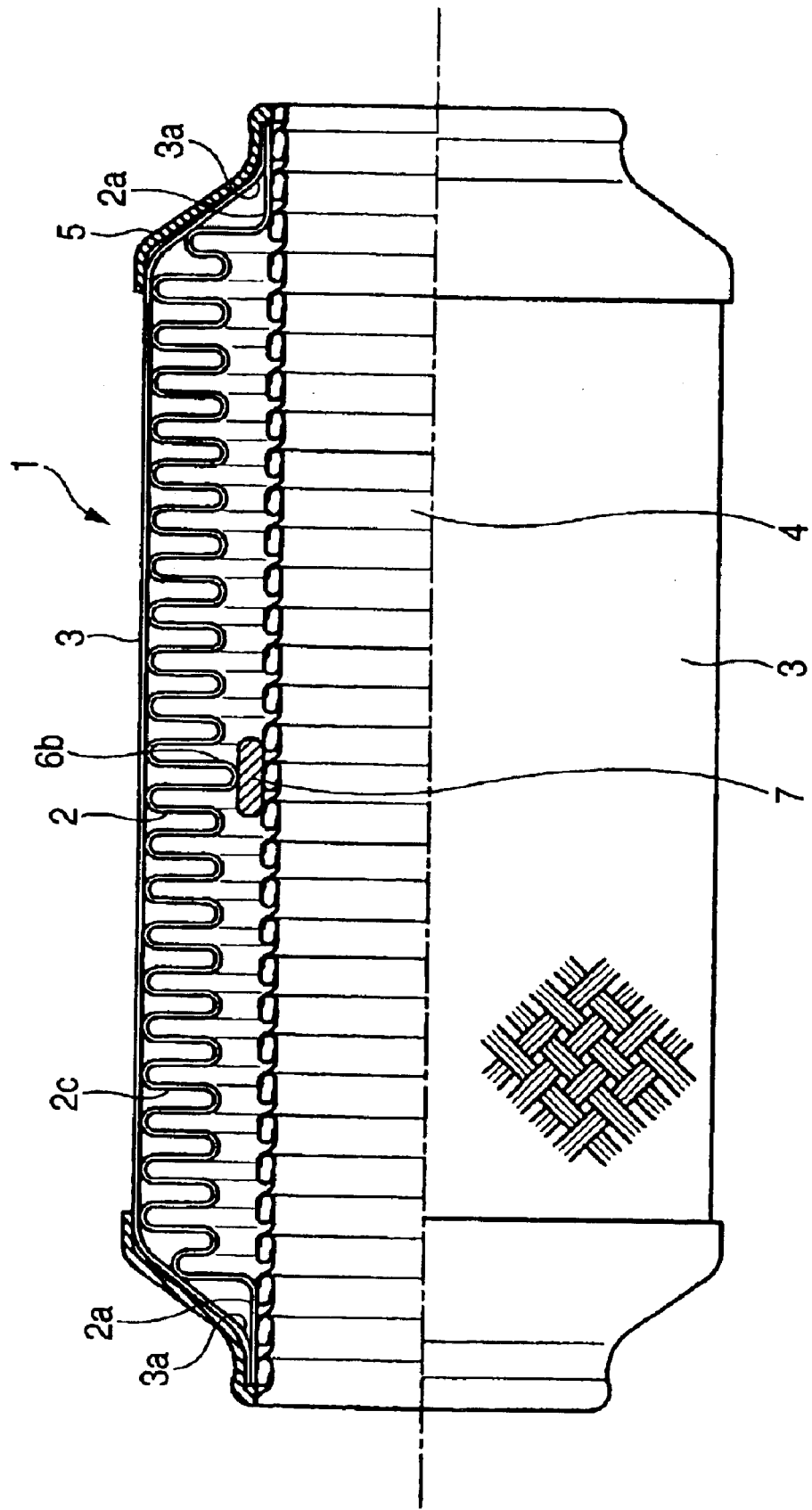
FIG. 3 is a view showing a second embodiment of the invention.

FIG. 3 shows a second embodiment.

A small diameter part which is part of restriction member, 6b in the vicinity of a center portion of the bellows portion 2c of the bellows tube 2 in an axial direction, has a smaller diameter than the usual small-diameter parts. However, the small-diameter part 6b does not butt against the interlock pipe 4. A restriction buffer member 7 is attached in a gap between an inner peripheral end of the small-diameter part 6b and the interlock pipe 4 so that the small-diameter part 6b restricts the swing of the interlock pipe 4 through the restriction buffer member 7. The restriction buffer member 7 is attached to a place in the vicinity of a center of the interlock pipe 4 corresponding to the small-diameter part 6b, by spot welding or the like.

In the embodiment, the small-diameter part 6b and the buffer member 7 attached to the interlock pipe 4 may constitute the restricting member in the invention.

The small-diameter part 6b is set to have a smaller diameter so that it does not butt against the interlock pipe 4. However, the invention is not limited to this. Alternatively, the diameter of the small-diameter part 6b may be the same as the diameter of the usual small-diameter parts, and the restriction buffer member 7 may be attached in the gap between the inner peripheral end of the small-diameter part 6b and the interlock pipe 4.

Figure 4:
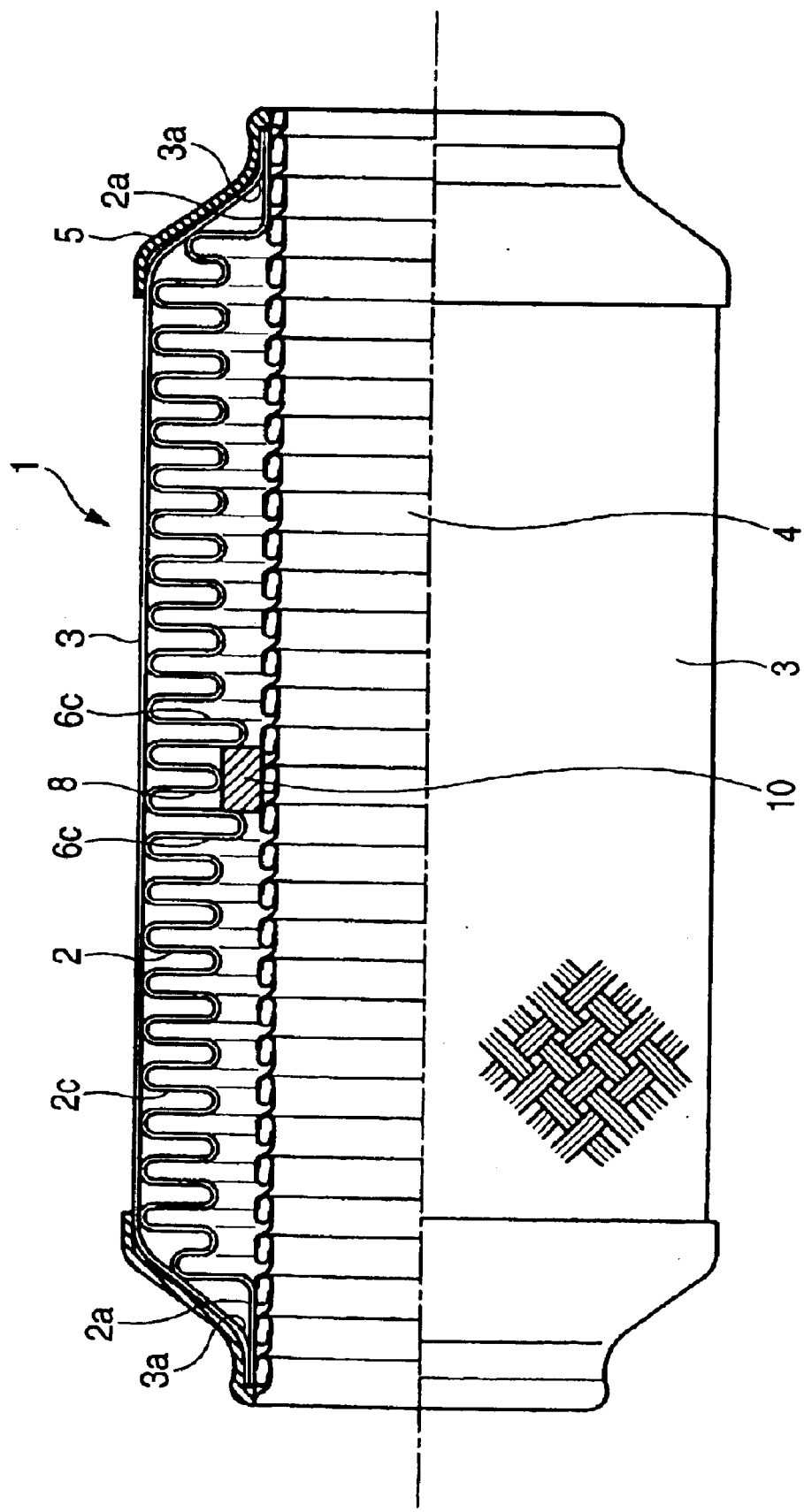
FIG. 4 is a view showing a third embodiment of the invention.
Figure 5:
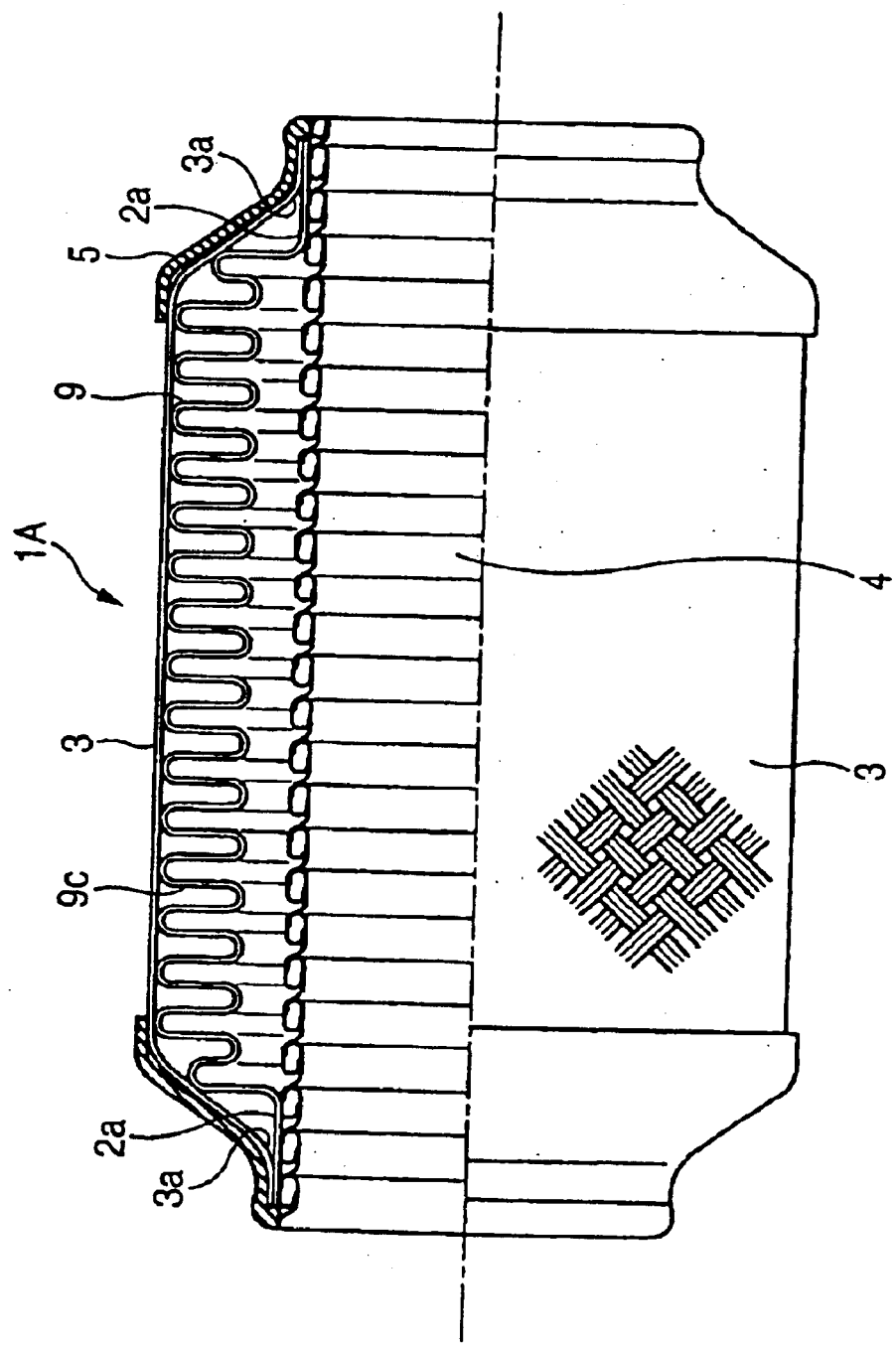
FIG. 5 is a view showing a flexible tube according to the prior art.
Figure 6:
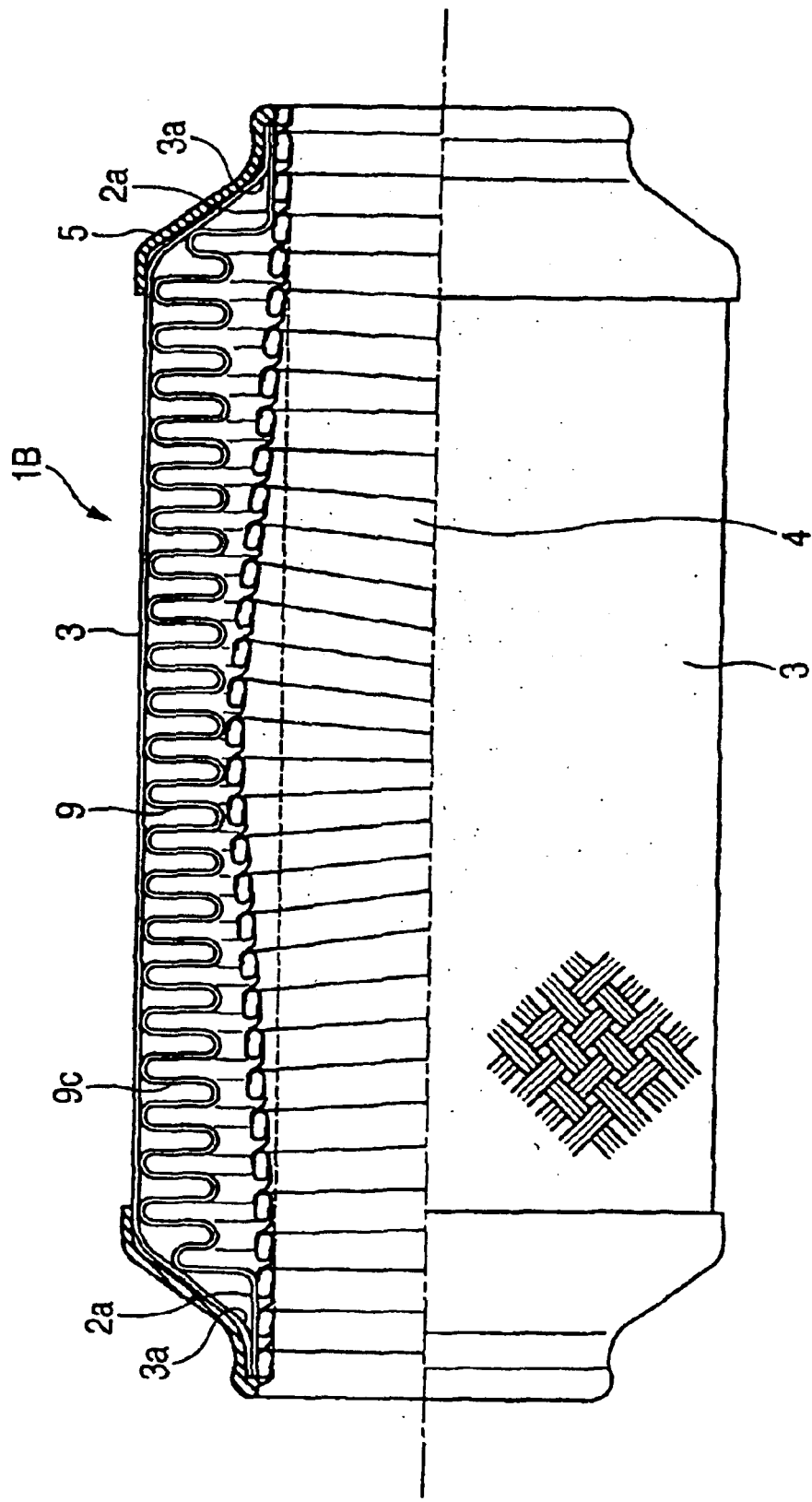
FIG. 6 is a view showing vibrations of an interlock pipe according to the prior art.

FIG. 4 shows a third embodiment.

A restriction buffer member 10 is placed between in a gap between a small-diameter part 8, which is part of the restriction member, in the vicinity of a center of the bellows portion 2c in an axial direction and the interlock pipe 4. Flanking restriction members 6c, which are provided on both sides of the small-diameter part 8, diameters such that the flanking restriction members 6c do not butt against the interlock pipe 4. The restriction buffer member 10 is clamped between the flanking restriction members 6c to restrict its axial movement.

According to the configuration, the restriction buffer member 10 held by the flanking restriction members 6c butts against the interlock pipe 4, whereby the swing of the interlock pipe 4 can be restricted.

The buffer member 10, and the small-diameter parts 8 and 6c of the bellows portion 2c may constitute the restricting member in the invention.

According to the embodiment, since the restriction buffer member 10 is held at both sides by the flanking restriction members 6c, the restriction buffer member 10 does not slip off even when the restriction buffer member 10 is not fixed to the small-diameter part 8 by welding or the like.

In the embodiments described above, one fulcrum of the swing of the interlock pipe 4 is disposed in the vicinity of the center of the bellows tube 2 with using the small-diameter part 6a, 6b, 6c, or 8 or the restriction buffer member 7 or 10. Alternatively, a plurality of fulcrums may be disposed with using a plurality of small-diameter parts 6a, 6b, 6c, or 8 or restriction buffer members 7 or 10.

The fulcrum of the swing of the interlock pipe 4 is disposed in the vicinity of the center. Alternatively, the fulcrum may be disposed in another predetermined position.

In the second embodiment, the restriction buffer member 7 is attached to the interlock pipe 4. Alternatively, the buffer member may be fixed to the-small-diameter part restriction member 6b.

According to a first aspect of the invention, since the fulcrum of the swing of the interlock pipe depends on the usual small-diameter parts, the distance between the fulcrums is shortened, and hence the deflection amount of the interlock pipe is reduced. As a result, the vibration amplitude of the interlock pipe is reduced, and it is not necessary to excessively enlarge the gap between the bellows portion of the bellows tube and the interlock pipe, whereby the size and the like of the flexible tube can be reduced.

According to a second aspect of the invention, vibrations of the interlock pipe can be restricted by a simple structure without using an additional member.

According to a third aspect of the invention, since the gap between the usual small-diameter parts of the bellows portion of the bellows tube and the interlock pipe may be filled with using a restriction buffer member 7, 10, troubles such as noises can be prevented from occurring.

According to a fourth aspect of the invention, troubles such as noises can be prevented from occurring while the amplitude of the interlock pipe is restricted more surely.

According to a fifth aspect of the invention, the restriction buffer member 7. 10 can be held without using an additional member, and the amplitude of the interlock pipe can be restricted by the restriction buffer member 7, 10.

According to a sixth aspect of the invention, the number of fulcrums of vibrations of the interlock pipe may be increased by disposing a plurality of restricting means, and hence vibrations of the interlock pipe can be restricted more surely.

What is claimed is:

1. A flexible tube comprising:
    a bellows tube comprising:
        a bellows portion formed of a plurality of first small-diameter parts of a first inner diameter; and
        straight portions formed at a first and a second end of the bellows tube, respectively;
    an interlock pipe in which a plurality of annular plate members or spirally wound band plates are flexibly coupled at side edges thereof to one another through an interlock mechanism, wherein the interlock pipe is disposed inside the bellows tube, and wherein the bellows tube and the interlock pipe have a common axis; and
    a restriction member disposed on the bellows portion, for serving as a fulcrum to restrict a vibration amplitude of the interlock pipe when the interlock pipe is vibrated,
    wherein an inner diameter of the straight portions of the bellows tube is smaller than the first inner diameter of the first small-diameter parts of the bellows portion,
    wherein inner peripheral surfaces of the straight portions are fixed to an outer surface of the interlock pipe,
    wherein the bellows portion comprises a second small-diameter part having a second inner diameter which is smaller than that of the first inner diameter of the first small-diameter parts; and
    wherein the restriction member is a buffer member disposed between an inner peripheral tip of the second small-diameter part and the outer peripheral surface of the interlock pipe.

2. The flexible tube according to claim 1, wherein the restriction member is a plurality of restriction members arranged in the axial direction at a predetermined interval.

3. The flexible tube according to claim 1, wherein the second small-diameter part has an axial width that is substantially the same as the first small-diameter parts.

4. A flexible tube comprising:
    a bellows tube comprising:
        a bellows portion formed of a plurality of first small-diameter parts of a first inner diameter; and
        straight portions formed at a first and a second end of the bellows tube, respectively;
    an interlock pipe in which a plurality of annular plate members or spirally wound band plates are flexibly coupled at side edges thereof to one another through an interlock mechanism, wherein the interlock pipe is disposed inside the bellows tube, and wherein the bellows tube and the interlock pipe have a common axis;
    a restriction member disposed on the bellows portion, for serving as a fulcrum to restrict a vibration amplitude of the interlock pipe when the interlock pipe is vibrated,
    wherein an inner diameter of the straight portions of the bellows tube is smaller than the first inner diameter of the first small-diameter parts of the bellows portion,
    wherein inner peripheral surfaces of the straight portions are fixed to an outer surface of the interlock pipe,
    wherein the bellows portion has a plurality of second small-diameter parts having a second inner diameter, the second inner diameter being smaller than the first inner diameter of the first small-diameter-parts; and
    wherein the restriction member is a buffer member disposed between an inner peripheral tip of at least one of the small-diameter parts having the larger inner diameter and the outer peripheral surface of the interlock pipe, and
    wherein the second small-diameter parts flank the buffer member to hold the buffer member in the axial direction.

5. The flexible tube according to claim 4, wherein the restriction member is a plurality of restriction members arranged in the axial direction at a predetermined interval.

6. The flexible tube according to claim 4,
    wherein the bellows portion further includes a third small-diameter part having a third inner diameter, the third inner diameter being substantially the same as the first inner diameter of the first small-diameter parts,
    wherein the buffer member is disposed between the tip of at least the third small-diameter part and the outer peripheral surface of the interlock pipe, and
    wherein the second small-diameter parts are disposed on axial opposing sides of the third small-diameter part and the buffer member.

7. The flexible tube according to claim 6, wherein the buffer member contacts the outer peripheral surface of the interlock pipe without being fixed to the interlock pipe.

8. A flexible tube comprising:
    a bellows tube comprising:
        a bellows portion formed of a plurality of first small-diameter parts of a first inner diameter; and
        straight portions formed at a first and a second end of the bellows tube, respectively;
    an interlock pipe in which a plurality of annular plate members or spirally wound band plates are flexibly coupled at side edges thereof to one another through an interlock mechanism, wherein the interlock pipe is disposed inside the bellows tube, and wherein the bellows tube and the interlock pipe have a common axis; and
    restriction means disposed on the bellows portion, for serving as a fulcrum to restrict a vibration amplitude of the interlock pipe when the interlock pipe is vibrated,
    wherein an inner diameter of the straight portions of the bellows tube is smaller than the first inner diameter of the first small-diameter parts of the bellows portion,
    wherein inner peripheral surfaces of the straight portions are fixed to an outer surface of the interlock pipe,
    wherein the bellows portion comprises a second small-diameter part having a second inner diameter which is smaller than that of the first inner diameter of the first small-diameter parts; and
    wherein the restriction member is a buffer member disposed between an inner peripheral tip of the second small-diameter part and the outer peripheral surface of the interlock pipe.

9. A flexible tube comprising:
    a bellows tube comprising:

a bellows portion formed of a plurality of first small-diameter parts of a first inner diameter; and straight portions formed at a first and a second end of the bellows tube, respectively;

an interlock pipe in which a plurality of annular plate members or spirally wound band plates are flexibly coupled at side edges thereof to one another through an interlock mechanism, wherein the interlock pipe is disposed inside the bellows tube, and wherein the bellows tube and the interlock pipe have a common axis; and a restriction means disposed on the bellows portion, for serving as a fulcrum to restrict a vibration amplitude of the interlock pipe when the interlock pipe is vibrated, wherein an inner diameter of the straight portions of the bellows tube is smaller than the first inner diameter of the first small-diameter parts of the bellows portion, wherein inner peripheral surfaces of the straight portions are fixed to an outer surface of the interlock pipe, wherein the bellows portion has a plurality of second small-diameter parts having a second inner diameter, the second inner diameter being smaller than the first inner diameter of the first small-diameter parts; and wherein the restriction member is a buffer member disposed between an inner peripheral tip of at least one of the small-diameter parts having the larger inner diameter and the outer peripheral surface of the interlock pipe, and wherein the second small-diameter parts flank the buffer member to hold the buffer member in the axial direction.

* * * * *